May 6, 1924.  
E. H. WRAY  
ADJUSTABLE BORING BAR SUPPORT  
Filed Feb. 11, 1921

1,492,618

Inventor  
Edward H. Wray.  
By Joseph K. Schofield  
Attorney

Patented May 6, 1924.

1,492,618

UNITED STATES PATENT OFFICE.

EDWARD H. WRAY, OF PHILADELPHIA, PENNSYLVANIA, ASSIGNOR TO NILES-BEMENT-POND COMPANY, OF NEW YORK, N. Y., A CORPORATION OF NEW JERSEY.

ADJUSTABLE BORING-BAR SUPPORT.

Application filed February 11, 1921. Serial No. 444,160.

*To all whom it may concern:*

Be it known that I, EDWARD H. WRAY, a citizen of the United States, residing at Philadelphia, in the county of Philadelphia and State of Pennsylvania, have invented certain new and useful Improvements in Adjustable Boring-Bar Supports, of which the following is a specification.

This invention relates to boring machines and particularly to an attachment adapted to support the boring bar and head centrally within the bore of the work during the boring operation. For boring large and heavy pieces of work such for example as guns and gun hoops, the boring bar must necessarily be very long and heavy. As the cutter head is fed through the work during the boring operation, the same, unless supported by means auxiliary to the means supporting the bar at its ends, will bend or sag considerably, due to the weight of the bar and head.

The present invention has for its primary object to provide means for supporting a boring head and bar centrally of the bore in the work during the boring operation, the supporting means being adapted to travel along with and adjacent the boring head as the same is fed through the work. Another object of the invention is to provide an adjustable support for the boring bar, such support being adapted to be adjusted radially of the bar to adapt the same to support the bar in a position centrally within pieces of work having different sized bores therein. A further object of the invention is to provide a two-part boring bar and head support, such parts being preferably pivotally connected together in a manner adapting the same to be radially and easily attached to or detached from the boring bar or head.

With the above and other objects in view which will appear as the description proceeds, the invention will now be described by reference to the drawing wherein.

Figure 1:
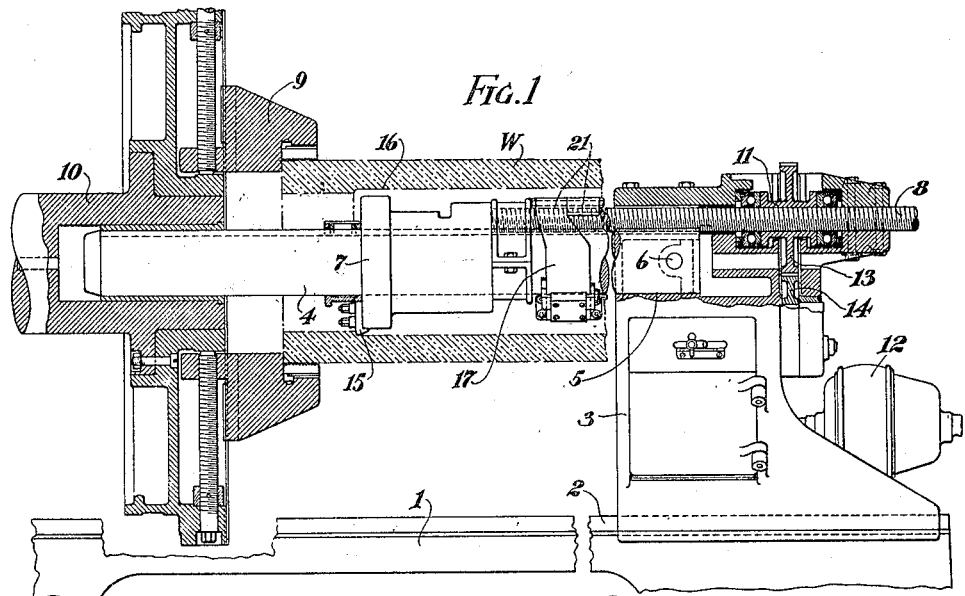
Figure 1 is a side elevation, partially broken away and partly in section, showing a boring machine illustrating the present invention as applied thereto.

In a boring machine of the type illustrated in the drawing wherein the ends of the boring bar are supported in bearings with the work therebetween, the bar must necessarily be longer than the work. The bar, as illustrated, is supported at one end in the machine and the other end thereof is entered within a socket centrally of the work-rotating spindle. In boring long and heavy pieces of work, the boring bar must necessarily be very long and heavy and during the boring operation the bar will sag at the center unless supported by some means within the work. The novel means for performing this function will be hereinafter described.

1 designates the base of a boring machine on ways 2 of which is slidably mounted a boring bar supporting upright 3. 4 designates the boring bar, one end of which is rigidly mounted within the bearing 5 in the upright 3 and secured against rotation therein by means of a pin 6. A boring head 7 is mounted to slide longitudinally along the bar and is fed therealong by means of a non-rotary screw 8. A piece of work W is supported at one end in the chuck jaws 9 of a work-rotating spindle 10. A nut 11 threadedly mounted on the screw 8 within the upright 3 is adapted to be rotated from a motor 12, through gears 13 and 14 to feed the screw and boring head longitudinally along the bar. As the head is fed along, the work is rotated in contact with the tool 15 whereby the work is bored out as illustrated at 16. It should be understood that only a small portion of the length of the boring bar, the screw and the work are shown in the drawing, the same being broken away intermediate the ends as illustrated. The construction as so far specifically described does not within itself comprise any part of the present invention, which will now be described.

Figure 4:
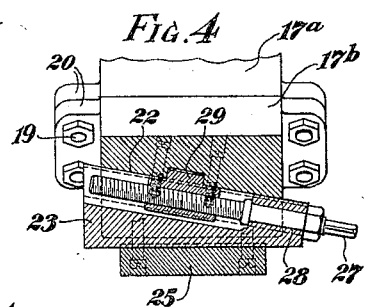
Fig. 4 is a fragmentary sectional view taken on the line 4—4 of Fig. 3.

17 designates an annular member or ring preferably comprising two or more parts whereby the same is adapted to be mounted on the boring bar as illustrated in Fig. 1. I have illustrated the member 17 as comprising two parts, 17ª and 17ᵇ pivoted together at 18 and adapted to be secured rigidly together by bolts 19 engaging flanges 20 at the opposite ends of the said parts. Adjacent the pivot 18 each part 17ª and 17ᵇ is provided with teeth 21 corresponding to the pitch of the screw threads on the screw 8, the teeth 21 being adapted to engage the threads of the screw 8 as illustrated. Adjacent the flanges 20, each of the parts 17ª and 17ᵇ is provided with a longitudinally extending inclined guideway 22. A block 23 having a central recessed portion 24 therein is slidably mounted in each guideway and each block is provided on its outer face with a work engaging shoe 25, secured to the block by means of bolts 26. Each block is adjustable along its guideway by means of a screw 27 journaled in the block at 28 and threadedly engaging a nut 29 secured to the ring or member 17 as illustrated in Fig. 4. It will be seen that rotation of the screw 27 moves the block over its inclined guideway whereby the block is adjusted radially of the ring. While I have preferred to illustrate two work supporting blocks and shoes arranged at opposite sides of the center of the ring, it will be understood that any desired number of blocks may be provided.

Figure 2:
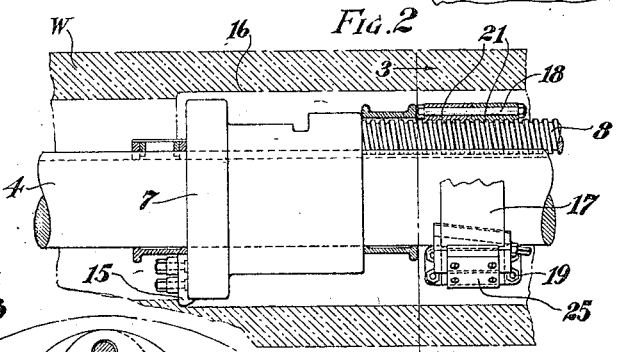
Fig. 2 is a fragmentary enlarged view of Fig. 1 showing certain of the mechanism comprising the invention in section.
Figure 3:
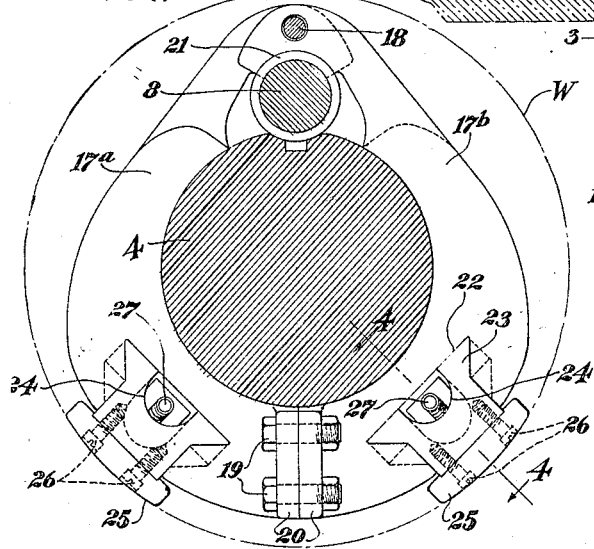
Fig. 3 is a cross section taken on the line 3—3 of Fig. 2.

In operation, the boring bar is first passed through the work and supported at both ends as illustrated in Fig. 1. The boring is then started and after the boring head has bored a sufficient distance into the work to permit the insertion of the bar support comprising the invention, the member 17 thereof is slipped over the bar 4 and screw 8 to the position illustrated in Figs. 1 and 2 and secured together by the bolts 19. After adjusting the blocks to the proper bar supporting position by means of the screws 27, the boring may be continued. Since the supporting member 17 engages the screw 8 at 21, such member will be moved along the bar with the boring head and therefore always be in a position closely adjacent the boring head. It will therefore be seen that the supporting member operates closely adjacent the boring head to support the bar and head in a position centrally of the bore in the work throughout the movement of the head along the entire length of the work.

What I claim is:

1. A support for a boring bar and a cutter head thereon, comprising the combination of means adapted to be mounted directly on the bar adjacent the head and to slide longitudinally thereon, means on the first means adapted to engage the inner surface of a piece of work to support the bar therein, and means for adjusting the work engaging means radially relative to the first means.

2. A support for a boring bar and a cutter head thereon, comprising the combination of an annular member adapted to be mounted directly on and to surround the bar adjacent the head and to slide longitudinally thereon with the head, means on the member adapted to engage the inner surface of a piece of work to support the bar therein, and means operative between the member and the work engaging means for adjusting the work engaging means radially relative to the member.

3. A support for a boring bar and a cutter head thereon, comprising the combination of an annular member adapted to be mounted directly on and to surround the bar adjacent the head and to slide longitudinally thereon, bar-supporting means comprising a plurality of members mounted in spaced relation around the annular member, and means for adjusting the said members radially of the annular member, the members being adapted to engage the work within the bore thereof to support the bar centrally of the bore.

4. A support for a boring bar and a cutter head thereon, comprising the combination of an annular member adapted to be mounted directly on and to surround the bar, a plurality of spaced elements on the member adapted to engage the inner surface of a piece of work to support the bar therein, and a screw operative between the member and each element for adjusting the elements radially relative to the member.

5. A support for a boring bar comprising the combination of an annular member adapted to surround the bar and provided with a plurality of inclined guideways therein extending in a general direction lengthwise of the bar, a work-engaging block slidably mounted in each guideway, and a screw operative between the member and each guideway for moving the blocks along the guideways to adjust the blocks radially of the member.

6. A support for a boring bar and a cutter head thereon, comprising the combination of an annular member adapted to be mounted directly on and to surround the bar, two spaced blocks mounted on the member, a screw whereby each block may be adjusted radially of the member, and a work-engaging shoe detachably mounted on each block.

7. A support for a boring bar comprising the combination of a two-part annular member mounted directly upon and surrounding the bar, means for detachably holding the said two parts together, means on the member adapted to engage the inner surface of a piece of work to support the bar therein, and means operative between the member and the work engaging means for adjusting the said work engaging means radially relative to the member.

8. A support for a boring bar comprising the combination of a plural-part annular member mounted directly upon and surrounding the bar and to slide longitudinally thereon, means for detachably holding the said parts together, means on the member adapted to engage the inner surface of a piece of work to support the bar therein, and means operative between the member and the work engaging means for adjusting the said work engaging means radially relative to the member.

9. A support for a boring bar comprising the combination of a two-part annular member pivotally connected together and adapted to surround the bar and to slide longitudinally thereon, means opposite the pivot for detachably holding the said two-parts together, means on the member adapted to engage the inner surface of a piece of work to support the bar therein, and means operative between the member and the work engaging means for adjusting the said work engaging means radially relative to the member.

10. In combination with a boring bar and a cutter head non-rotatably and slidably mounted thereon, a bar support comprising means mounted directly on the bar adjacent the head and slidable with the head on the bar as the tool is fed into the work, and means on the first means adjustable radially of the bar and adapted to engage the work within the bore thereof to support the bar and head centrally of the bore.

11. In combination with a boring bar, a cutter head non-rotatably and slidably mounted thereon, means for supporting and rotating a piece of work and means for holding the bar against rotation, a bar support comprising means mounted directly on the bar adjacent the head and slidable with the head on the bar as the tool is fed into the work, and means on the last named means adjustable radially of the bar and adapted to engage the work within the bore thereof to support the bar and head centrally of the bore.

12. In combination with a boring bar, a cutter head non-rotatably and slidably mounted thereon, means for supporting and rotating a piece of work and means for holding the bar against rotation, a bar support comprising means non-rotatably mounted directly on the bar adjacent the head and slidable with the head on the bar as the tool is fed into the work, and means on the last named means adjacent the lower side thereof adjustable radially of the bar and adapted to engage the work within the bore thereof to support the bar and head centrally of the bore.

13. In combination with a boring bar, a cutter head non-rotatably and slidably mounted thereon, means for supporting and rotating the work and means for holding the bar against rotation, a bar support comprising means non-rotatably mounted on the bar adjacent but independently of the head and slidable with the head on the bar as the tool is fed into the work, means comprising a pair of adjustable members on the last named means adjacent the lower side thereof, and means for adjusting each of the said members radially of the bar, the members being adapted to engage the work within the bore thereof to support the bar and head centrally of the bore.

14. In combination with a boring bar, a cutter head non-rotatably and slidably mounted thereon, means for supporting and rotating the work, a screw for feeding the cutter head along the bar into the work and means for holding the bar against rotation, a bar support comprising means non-rotatably mounted on the bar adjacent but independently of the head and slidable with the head on the bar as the tool is fed into the work, and means on the last named means adjacent the lower side thereof adjustable radially of the bar and adapted to engage the work within the bore thereof to support the bar and head centrally of the bore.

15. In combination with a boring bar, a cutter head non-rotatably and slidably mounted thereon, means for supporting and rotating the work, a screw adjacent the bar for feeding the cutter head along the bar into the work and means for holding the bar against rotation, a bar support comprising means non-rotatably mounted on the bar adjacent the head and provided with means engaging the screw whereby the support is fed along the bar with the head, and means on the support adjacent the lower side thereof adjustable radially of the bar and adapted to engage the work within the bore thereof to support the bar and head centrally of the bore.

In testimony whereof, I hereto affix my signature.

EDWARD H. WRAY.